United States Patent Office 2,914,586
Patented Nov. 24, 1959

2,914,586

METHOD FOR PURIFYING DURENE

Russell W. Walker, Lansing, Ill., assignor to Sinclair Refining Company, New York, N.Y., a corporation of Maine No Drawing. Continuation of application Serial No. 522,853, July 18, 1955. This application October 13, 1958, Serial No. 766,680

6 Claims. (Cl. 260—674)

This invention relates to a method of recovering durene from a hydrocarbon mixture containing it. More particularly, the invention is directed to obtaining yields of durene of a higher degree of purity than in the feed through crystallization and controlled slow warming of the resulting crystals while removing melt.

It has been the practice to separate durene from durene-containing hydrocarbon mixtures, such as naphtha reformate fractions boiling in the range between about 350 and 425° F. by crystallization, since separation of durene by distillation is generally impracticable because of the close proximity of the boiling point of durene to those of tetramethyl benzenes isomeric to durene, such as isodurene, usually present in such mixtures. Durene and isodurene reportedly form an eutectic mixture at about −18° F., the composition of the eutectic mixture being about 92% isodurene and 8% durene. Processes of crystallizing durene have been devised to avert the formation of an eutectic mixture containing durene by cooling durene-containing hydrocarbon fractions to just short of the point where the first eutectic of durene with accompanying compounds is formed. Such processes necessarily limit the yield of durene. Other processes involve repeated crystallization to obtain a product of greater purity. However, besides being costly, obtaining a relatively pure product by recrystallization is difficult since durene crystals are small and their large surface area occludes excessive amounts of mother liquor.

Surprisingly, particularly in view of the prior teaching, it has been found in the present invention that by the use of minimum temperatures substantially all of the durene in aromatic hydrocarbon fractions boiling within the range between about 360 and 400° F. and containing about 5 to 30% durene can be crystallized with apparently no formation of an eutectic. The absence of an eutectic is indicated by the phase behavior of the crystals as illustrated on a time-temperature plot of the crystallization operation. Possibly the eutectic is not formed because of the presence of hydrocarbons other than durene and isodurene in the aromatic feed. The relatively narrow boiling range of the feed may also exclude other eutectic-forming hydrocarbons. In addition to the excellent yields of product that are obtainable in a single crystallization by the process of this invention, the product is readily and easily purified to the extremely high degree of purity of about 95 weight percent durene by the controlled slow warming of the crystalline product from the crystallization temperature to a temperature somewhat above ambient temperature while removing melt. According to a separate and preferred form of this invention, a durene product of the exceptionally high degree of purity of at least 98 weight percent durene is readily and easily obtained by controlled slow warming of the crystalline mass from the crystallization temperature to about ambient temperature, followed by the washing of the crystalline product with a miscible, non-aromatic solvent at about ambient temperature.

In the practice of the present invention an aromatic hydrocarbon feed boiling in the range between about 360 and 400° F. and containing from about 5 to 30 weight percent of durene is cooled to below about −40° F. to crystallize a substantial portion of the durene in the feed. By a substantial portion is meant the crystallization of about 90% or greater of the amount of durene originally present in the hydrocarbon feed. The durene crystals are separated from their mother liquors and then warmed from the crystallization temperature to a temperature somewhat above ambient temperature in the range between about 110 and 130° F. to increase the purity of the crystals to about 95 weight percent of durene. Warming of the crystals is carefully controlled at a rate below about 45° F. per hour and preferably below 36° F. per hour. Preferably, a rate of warming of at least about 20° F. per hour is employed to minimize refrigeration costs and provide a significant rate of durene production. Melt formed during the warming of the crystals is removed substantially continuously.

According to a separate and preferred embodiment of this invention, the controlled warming of the crystals is continued until the crystalline product has reached the temperature within the range between about 60 and 80° F., and the warmed crystals are then further purified to a purity of at least about 98 weight percent durene by washing the crystalline product at a temperature in the range between about 60 and 80° F. with a suitable extractive material. Separation of any traces of extractive material from the crystals, if desired, can then be effected in any suitable manner. By this embodiment of the invention, a durene product of the exceptionally high degree of purity of at least 98 weight percent durene is readily obtained.

The process of this invention has application to the separation of durene from reformates boiling in the range from about 360 to 400° F. and those aromatic hydrocarbon fractions boiling in this range obtained by distillation of crude petroleum, catalytic or thermal cracking and other operations producing aromatic concentrates. A preferred crystallizer feed is a naphtha reformate fraction boiling in the range between about 370 and 400° F. Advantageously, such fraction can contain about 95 percent or more of aromatics including up to about 15% or more of durene.

The temperature to which an aromatic feedstock must be cooled to crystallize a substantial portion, i.e. 90% or more of durene therein, will depend upon the durene concentration in such feed. The lower the concentration of the durene in the feed, the lower will be the temperature required to crystallize a substantial portion of the durene. With the feedstocks of the present invention, cooling to a temperature below about −40° F. is done to insure the crystallization of 90% or more of durene. Since yield of durene depends upon the amount of durene that is crystallized in the crystallization step, the feed is preferably cooled until substantially all of the durene in the feed is crystallized. Rate of cooling and holding time at the crystallization temperature does not affect the yield or purity of the durene product to any significant extent, supercooling of durene not being a particular problem because of the relatively low crystallization temperatures employed.

Durene crystals are separated from the cooled fraction or mother liquor by centrifugation, filtration or other suitable methods. This separation step is preferably conducted at the crystallization temperature or only slightly thereabove to prevent loss of durene to the substantial quantity of solubilizing mother liquor present.

It was found that durene crystals can be readily and economically purified by the controlled slow warming of the crystals at a rate below about 45° F. per hour, and preferably at a rate below about 36° F. per hour while substantially continuously removing melt formed. Generally, the controlled slow warming of the crystals at or somewhat below these rates will permit substantially no temperature gradient throughout the mass of crystals. Thus, impure crystals throughout the mass of crystals melt first and the resulting melt serves as a wash for the remaining solid. In addition, mother liquor occluded or adsorbed on the surface of the durene crystals is held less tenaciously as the temperature is raised and is readily removed during the warming operation. The controlled warming of the crystals can be continued to temperatures somewhat above ambient temperature in the range between about 110 and 130° F. to obtain a product having a purity of about 95 weight percent durene. It was observed that a durene product having a purity of about 80 to 85 weight percent durene is readily obtained by controlled warming of the crystals to a temperature in the range between about 60 and 80° F.; but if purification by controlled warming is continued to temperatures somewhat above this range, the rate of purification is slower and there is a marked increase in durene loss. It was found that the product having a purity of 80 to 85 weight percent durene obtained by the slow warming of the crystals from the crystallization temperature to a temperature within the range between about 60 and 80° F. could be further purified to the exceptional high degree of purity of at least about 98 weight percent durene, by washing the product with a suitable extractive material at a temperature between about 60 and 80° F. In addition, the yield of product having a purity of at least 98 weight percent is essentially the same as the yield of product having a purity of about 95 weight percent obtained by controlled warming to somewhat higher temperatures without washing of the crystalline product. Thus, the original solid or mass of crystals is preferably warmed at a rate not exceeding about 36° F. per hour from the crystallization temperature to a temperature within the range between about 60 and 80° F. and the crystals of substantially increased purity are washed at a temperature within this range with a suitable inert extractive material to obtain a substantially pure durene product.

The extractive materials which can be employed to wash the crystals are non-aromatic organic solvents having up to 8 carbon atoms which have a highly selective solvent action at the wash temperatures of my process, i.e. at temperatures in the range between about 60 and 80° F., for at such temperatures they have a relatively low solvent power for durene, although they are substantially completely miscible with impurities, such as mother liquor, occluded or adsorbed on the durene crystals. Suitable non-aromatic extractive solvents include lower aliphatic hydrocarbons such as paraffins, olefins, alcohols, ketones, ethers, esters, and cyclic hydrocarbons such as cycloparaffins. For example, among the paraffins, olefins and cycloparaffins are those containing 5 to 8 carbon atoms such as pentane, pentene and cyclopentane. Among the aliphatic alcohols are those containing 1 to 5 carbon atoms such as methyl alcohol and isopropanol. Aliphatic ketones containing 3 to 6 carbon atoms, such as acetone and methyl isobutyl ketone, are examples of suitable ketones. Also lower saturated and unsaturated chlorinated aliphatic hydrocarbons such as olefins and paraffins, e.g. ethylene dichloride, methyl chloride, carbon tetrachloride, ethyl chloride, trichloroethylene, and tetrachloroethylene can be employed. Among useful aliphatic esters are those containing 4 to 7 carbon atoms such as amyl acetate, isopropyl acetate, and ethyl acetate. Typical of the ethers and nitriles which can be employed are ethyl ether and acetonitrile. Mixtures of these solvents can also be employed, and successive washes with different solvents are also effective. The preferred solvent is methanol.

Because the durene crystals have been purified substantially by controlled warming to about 80 to 85 weight percent durene, the handling of extractive material or solvent is greatly simplified since only relatively small amounts of solvent need be employed, and no refrigeration is required. For example, a purity of at least about 98 weight percent durene generally can be obtained by washing the crystals with that quantity of solvent having a weight about equivalent to the weight of the crystalline product to be treated. Furthermore, the solvent can be recycled to the wash step several times before requiring purification, for the solvent is but slightly contaminated during each washing of the relatively pure product.

A small amount of solvent may be adsorbed or entrained by the durene crystals during the washing operation. Separation of the solvent from the crystals can be readily effected by distillation or by blowing the crystals with an inert gas such as air.

Yields of durene, having a purity of at least about 98 weight percent, of 70 percent or better based on weight of durene available in the feed are generally obtainable according to the preferred form of my invention, and similar yields of durene in somewhat less pure form are obtainable by purification by controlled warming alone.

The following specific examples of the processes of this invention are given merely by way of illustration and are in no manner to be considered as limiting the scope of the invention.

*Example I*

A feed comprising 120.0 g. of an aromatic concentrate boiling in the range between 370 and 397° F. and analyzing 19.0 weight percent durene was cooled while stirring to $-76°$ F. The resulting slurry was maintained at the crystallization temperature for about 0.25 hour and then transferred to a sintered glass funnel which had been previously solvent cooled to $-76°$ F. 61.0 g. of mother liquor containing less than 3 percent durene were filtered off at the crystallization temperature leaving 59.0 g. of a solid cake which analyzed 32% durene. The solid and cooling medium were then warmed to 122° F. at a rate of approximately 36° F. per hour and suction filtration was continued substantially the entire time the solid was being warmed. At about 68° F. the funnel contained 25.8 g. of solid analyzing 83 weight percent durene. Upon continued warming to 122° F., 17.3 grams of solid analyzing 95 weight percent durene, and representing a yield of about 72% based on durene available in the feed, was obtained.

*Example II*

127.3 grams of the feed of Example I were cooled while stirring to $-76°$ F.; the resulting slurry was maintained at the crystallization temperature for about 0.25 hour and then transferred to a sintered glass funnel which had been previously solvent cooled to $-76°$ F. 65.1 grams of mother liquor containing less than 3% durene were filtered off at the crystallization temperature leaving 62.2 grams to solid analyzing 32 weight percent durene. The solid and cooling medium were then warmed to 68° F. at a rate of approximately 36° F. per hour, and suction filtration was continued substantially the entire time the solid was being warmed. 18.1 grams of solid analyzing 82 weight percent durene were obtained. The solid was washed at 68° F. with a volume of methanol about equivalent to the volume of solid on the filter, and 17.4 grams of product having a purity of 99 weight percent durene was obtained, representing a yield of 72% based on durene available in the feed.

*Example III*

A feed comprising 73.5 grams of an aromatic concentrate boiling in the range between 370° and 397° F. and analyzing 10.8 weight percent durene was subjected to the process of Example II, but a crystallization temperature of about $-108°$ F. was employed. 5.7 grams of solid having a purity of 99 weight percent durene was obtained, representing a yield of 72.2% based on durene available in the feed.

This application is a continuation of application Serial No. 522,853, filed July 18, 1955.

I claim:

1. The method of separating durene from an aromatic hydrocarbon fraction containing about 5 to 30% durene and boiling in the range between about 360 and 400° F. which comprises cooling said fraction to a crystallization temperature below about −40° F. to crystallize a substantial portion of the durene in said fraction, separating durene crystals from mother liquor, and warming said crystals from about said crystallization temperature to a temperature in the range between about 110 and 130° F. at a rate below about 45° F. per hour, while substantially continuously removing melt.

2. The method of separating durene from an aromatic hydrocarbon fraction containing about 5 to 30% durene and boiling in the range between about 370 and 400° F. which comprises cooling said fraction to a crystallization temperature below about −40° F. to crystallize substantially all of the durene in said fraction, separating durene crystals from mother liquor at about the crystallization temperature, and warming said crystals from about said crystallization temperature to a temperature in the range between about 110 and 130° F. at a rate below about 36° F. per hour while substantially continuously removing melt.

3. The method of separating durene from an aromatic hydrocarbon fraction containing about 5 to 30% durene and boiling in the range between about 360 and 400° F. which comprises cooling said fraction to a temperature below about −40° F. to crystallize a substantial portion of durene in said fraction, separating durene crystals from mother liquor, warming said crystals from about said crystallization temperature to a temperature in the range between about 60 and 80° F. at a rate below about 45° F. per hour while substantially continuously removing melt, and washing said crystals at a temperature between about 60 and 80° F. with a non-aromatic organic solvent containing up to 8 carbon atoms.

4. The method of claim 3 wherein the non-aromatic organic solvent is methanol.

5. The methed of separating durene from an aromatic hydrocarbon fraction containing about 5 to 30% durene and boiling in the range between about 370 to 400° F. which comprises cooling said fraction to a temperature below about −40° F. to crystallize substantially all of the durene in said fraction, separating durene crystals from mother liquor at about the crystallization temperature, warming said crystals from about said crystallization temperature to a temperature in the range between about 60 and 80° F. at a rate below about 36° F. per hour while substantially continuously removing melt, and washing said crystals at a temperature between about 60 and 80° F. with a non-aromatic organic solvent containing up to 8 carbon atoms.

6. The method of claim 5 wherein the non-aromatic organic solvent is methanol.

References Cited in the file of this patent

UNITED STATES PATENTS

| | | |
|---|---|---|
| 2,533,232 | Dressler | Dec. 12, 1950 |
| 2,560,373 | Shmidl | July 10, 1951 |
| 2,665,316 | Bennett | Jan. 5, 1954 |
| 2,823,241 | Bennett et al. | Feb. 11, 1958 |